(12) United States Patent
Callaghan et al.

(10) Patent No.: US 8,103,441 B2
(45) Date of Patent: Jan. 24, 2012

(54) CACHING NAVIGATION CONTENT FOR INTERMITTENTLY CONNECTED DEVICES

(75) Inventors: David M. Callaghan, Kirkland, WA (US); Mark Scott Tonkelowitz, Seattle, WA (US); Ashley Nathan Feniello, Redmond, WA (US); Graham A. Wheeler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 12/146,534

(22) Filed: Jun. 26, 2008

(65) Prior Publication Data
US 2009/0326810 A1    Dec. 31, 2009

(51) Int. Cl.
*G01C 21/00* (2006.01)
(52) U.S. Cl. ........................................ 701/201; 701/206
(58) Field of Classification Search .................. None
See application file for complete search history.

(56) References Cited

U.S. PATENT DOCUMENTS

| | | | |
|---|---|---|---|
| 6,377,210 B1 | 4/2002 | Moore | |
| 6,452,544 B1 | 9/2002 | Hakala et al. | |
| 6,691,128 B2* | 2/2004 | Natesan et al. | 1/1 |
| 7,010,426 B1 | 3/2006 | Watermulen et al. | |
| 7,143,241 B2 | 11/2006 | Hull | |
| 7,158,878 B2 | 1/2007 | Rasmussen et al. | |
| 7,315,259 B2 | 1/2008 | Sacks | |
| 7,672,778 B1* | 3/2010 | Elliott | 701/209 |
| 7,821,986 B2* | 10/2010 | Thomson et al. | 370/328 |
| 2003/0125043 A1* | 7/2003 | Silvester | 455/456 |
| 2005/0144049 A1 | 6/2005 | Kuzunuki et al. | |
| 2006/0089160 A1 | 4/2006 | Othmer | |
| 2006/0167628 A1* | 7/2006 | Karaoguz et al. | 701/211 |
| 2007/0176796 A1 | 8/2007 | Bliss et al. | |
| 2007/0219708 A1 | 9/2007 | Brasche et al. | |

OTHER PUBLICATIONS

Michael Juntao Yuan, "Developing Web-Service-Driven, Smart Mobile Applications", Date: Feb. 23, 2004, http://www.ondotnet.com/pub/a/dotnet/2004/02/23/mobilewebserviceapps.html.
"Mobile Search V2 released—Improved Navigation, Cache, Movie Searching, GPS, Traffic reporting and More!" http://virtualearth.spaces.live.com/Blog/cns!2BBC66E99FDCDB98!8910.entry, Feb. 11, 2008.

* cited by examiner

*Primary Examiner* — Michael J. Zanelli

(57) ABSTRACT

Selectively caching content related to routing data in a computing device. Prior to traversing a route, one or more access points to a network are identified. An expected level of access to a network (e.g., signal strength) along the route is determined. Portions of the route are selected based on the expected level of access. Content corresponding to at least one of the selected portions is received and stored for access during traversal of the route. For example, map images for areas expected to have poor network connectivity are cached prior to traversing the route to ensure that routing data is displayed to a user when in those areas. During transversal of the route, content is obtained and cached if a current level of access is less than a defined threshold.

20 Claims, 7 Drawing Sheets

CACHING NAVIGATION CONTENT FOR INTERMITTENTLY CONNECTED DEVICES

BACKGROUND

Existing mobile devices such as cellular telephones or personal digital assistants (PDA) have global positioning system (GPS) capabilities. These mobile devices typically include computer-readable media storing navigational map information such as, for example, road information, address information, and the like. Existing mobile devices download a partial or an entire geographic region to provide a user with detailed map and routing information. However, the mobile devices typically have limited storage capacity that is often exclusively dedicated to map regions, thus leaving limited functionality for navigation purposes. Example navigation purposes include accessing real-time information such as traffic congestion or local advertising. Further, there are often costs passed along to an end user when manually updating the map regions.

Some mobile devices include network connections and mobile operator application services for providing location-based map services. These mobile devices have the ability to download map tiles on demand and to retain a local cache of recently traveled regions for future access. To keep memory use to a minimum, however, these existing systems do not account for moments of intermittent loss of network connectivity or for geographic regions without signal coverage. Further, retained map tiles are purged as soon as the corresponding portion of the route has been traversed. Upon entering an area of poor network connectivity or no signal coverage, map tiles are either intermittently received and displayed, or not received or displayed at all.

SUMMARY

Embodiments of the invention enable the selective caching of navigation content for a route for traversal by a computing device. Some embodiments identify one or more access points to a network along the route and determine an expected level of access to the network along the route based on the access points. One or more portions of the route are selected based on the expected level of access. The navigation content to the selected portions is received and stored by the computing device prior the computing device entering the selected portions of the route.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
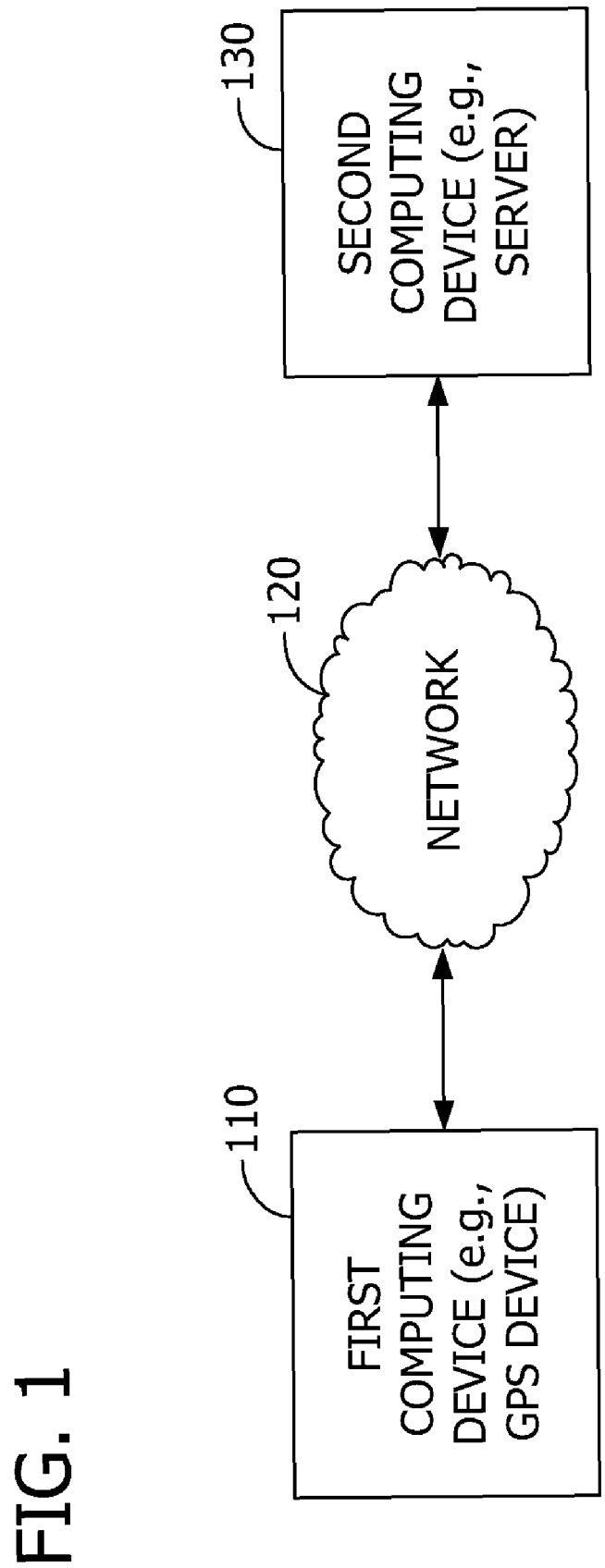
FIG. 1 is an exemplary block diagram illustrating an operating environment suitable for use in implementing embodiments of the invention.

Embodiments of the invention enable a computing device with navigation functionality such as a first computing device 110 in FIG. 1 to cache map images (e.g., map tiles) for a route. The map images are received from a second computing device 130 such as a server via a network 120. In some embodiments, the first computing device 110 includes a mobile device with global positioning system (GPS) capabilities gathering map tiles to ensure that a user has round trip route information stored in a cache. The map tiles are selected based on criteria including, but not limited to, location of network access points (e.g., cell towers) and expected signal strength at the network access points.

A map tile (e.g., map tile 510 in FIG. 5) includes, for example, a portion of an overall map showing one section of a map with a defined level of detail (e.g., zoom level). While not limiting in any way, the map tile includes a graphic image that has a scalable size and sufficient graphics content to provide a mapping background. In some embodiments, the first computing device 110 accesses signal tower location information or other network access points and expected network coverage area information from the second computing device 130 through the network 120 to identify and cache map tiles in regions without network coverage or in areas of poor network connectivity. The caching ensures that the user has sufficient map tiles in the cache in the first computing device 110. Aspects of the invention are embodied as a GPS map tile agent (not shown) executing on the first computing device 110. The GPS map tile agent provides an intelligent cache function to ensure that map images and points of interest (POI) data, as well as other related metadata or content, remains available to the user throughout a trip at various interpolated and non-interpolated zoom levels. The GPS map tile agent ensures that tiles are available for presentation to the user throughout the route regardless of signal strength or signal availability.

While embodiments of the invention are illustrated and described herein with reference to the mobile device or other portable device such as a laptop, embedded device, telephone, a personal digital assistant, or a gaming console, aspects of the invention are operable with any computing device that performs the functionality illustrated and described herein, or its equivalent. For example, embodiments of the invention are operable with a desktop computing device, a laptop computer, and other portable and non-portable computing devices to capable of providing navigation functionality.

Further, the network 120 may include radio frequency and wired connection endpoints and bridges for standard mobile phone communication technologies such as global system for mobile communications (GSM), 3G mobile communication technology, code division multiple access (CDMA), and universal mobile telecommunications system (UMTS). The network 120 may also include an interface to a GPS receiver mechanism to receive satellite signals, local mobile transmitters, and other technologies via wireless fidelity (Wi-Fi) networks and BLUETOOTH brand networks.

Figure 2:
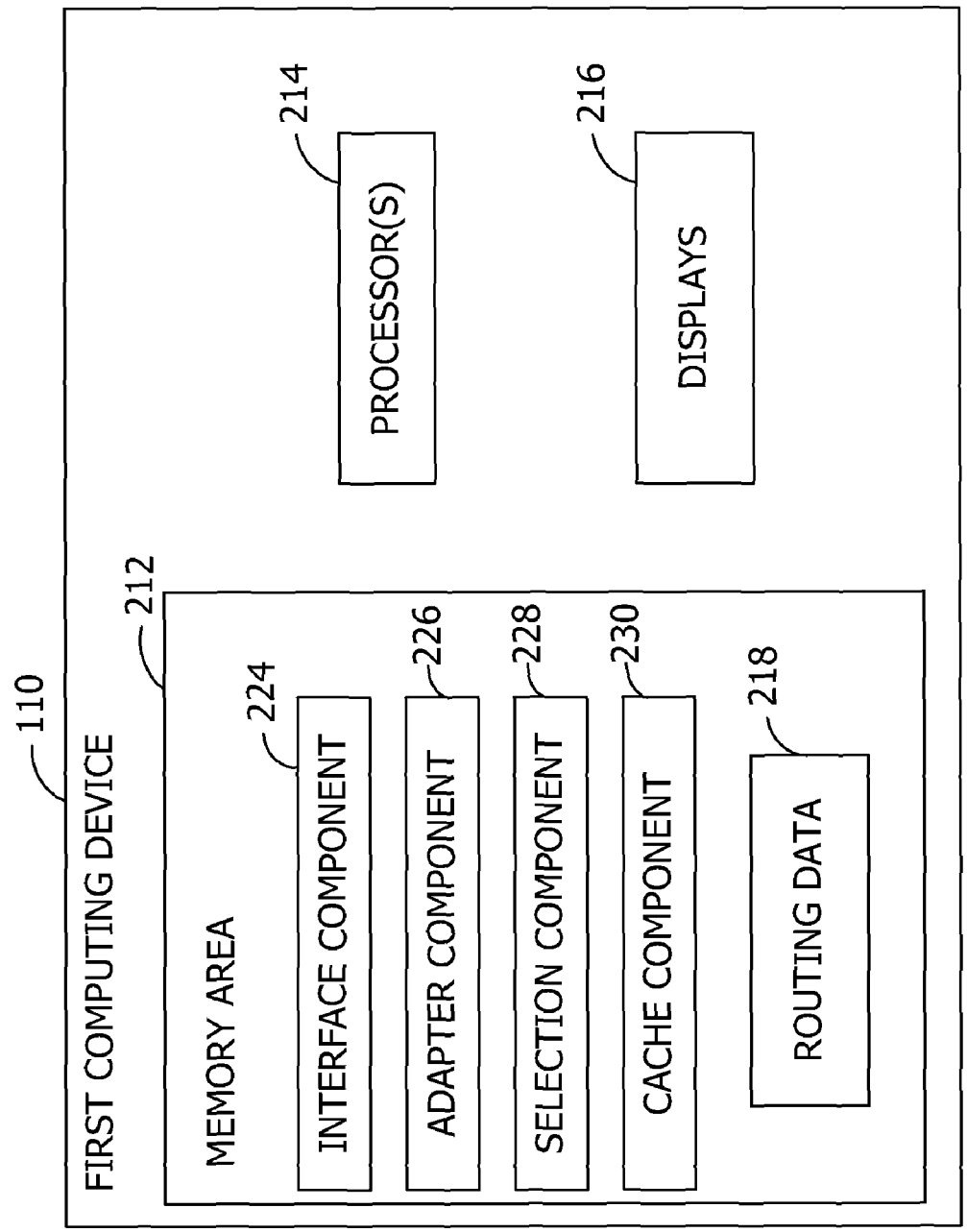
FIG. 2 is an exemplary block diagram of a computing device having a memory area storing components for caching map tiles prior to traversal of a route.

Referring now to FIG. 2, the first computing device 110 includes a memory area 212, at least one processor 214, and one or more displays 216 for displaying navigation information to the user. Although the processor 214 is shown separate from the memory area 212, embodiments of the invention contemplate that the memory area 212 may be onboard the processor 214, such as in some embedded systems. The diagram of FIG. 2 is merely illustrative of an exemplary computing device that can be used in connection with one or more embodiments of the invention, and is not intended to be limiting in any way. Further, peripherals or components of the computing device 110 known in the art are not shown, but are operable with aspects of the invention. For example, a speaker, printing component, vibrating component, or the like are contemplated.

Memory area 212, or other computer-readable media, stores computer-executable components identifying and caching the map tiles. Exemplary components include, but are not limited to an interface component 224, an adapter component 226, a selection component 228, and a cache component 230. The memory area 212 further stores routing data 218 or other content such as turn-by-turn navigation instructions for a route, a start point and an end point for the route, and map tiles for the route.

The components in the first computing device 110 execute during traversal of the route. Other embodiments of the invention execute prior to traversal of the route (see FIG. 3 and FIG. 4).

Referring again to FIG. 2, the interface component 224 receives, by the first computing device 110 from the second computing device 130 via a connection such as the network 120, content corresponding to one or more waypoints in a sequential series of waypoints. The receiving occurs during traversal of a portion of a route by the first computing device 110. In embodiments, the interface component 224 includes a GPS transceiver. The adapter component 226 determines a characteristic of the connection based on a receipt of the content by the interface component 224. In embodiments, the adapter component 226 determines signal strength for the connection during the receipt by the interface component 224 of the content corresponding to the one or more waypoints. The selection component 228 compares the characteristic determined by the adapter component 226 to one or more criteria. In embodiments, the selection component 228 compares the signal strength determined by the adapter component 226 to a threshold value.

The cache component 230 obtains the content corresponding to the at least one waypoint if the signal strength is less than the threshold value. The cache component 230 obtains, by the first computing device 110 from the second computing device 130 based on the comparison by the selection component 228, content corresponding to at least one waypoint subsequent to the one or more waypoints in the sequential series of waypoints. For example, the cache component 230 obtains map images for the at least one waypoint (e.g., in an area of poor network coverage). The cache component 230 obtains the content during traversal of the portion of the route during which the interface component 224 receives the content (e.g., in an area of sufficient network coverage). In embodiments, the cache component 230 stores the content corresponding to the at least one waypoint for a time period exceeding a duration of traversal of the route. For example, the cache component 230 stores the content corresponding to the at least one waypoint for use during a reverse traversal of the route.

In embodiments, the processor 214 is transformed into a special purpose microprocessor by executing computer-executable instructions or by otherwise being programmed. For example, the processor 214 is programmed with instructions such as is illustrated in FIG. 3 and FIG. 4.

Figure 3:
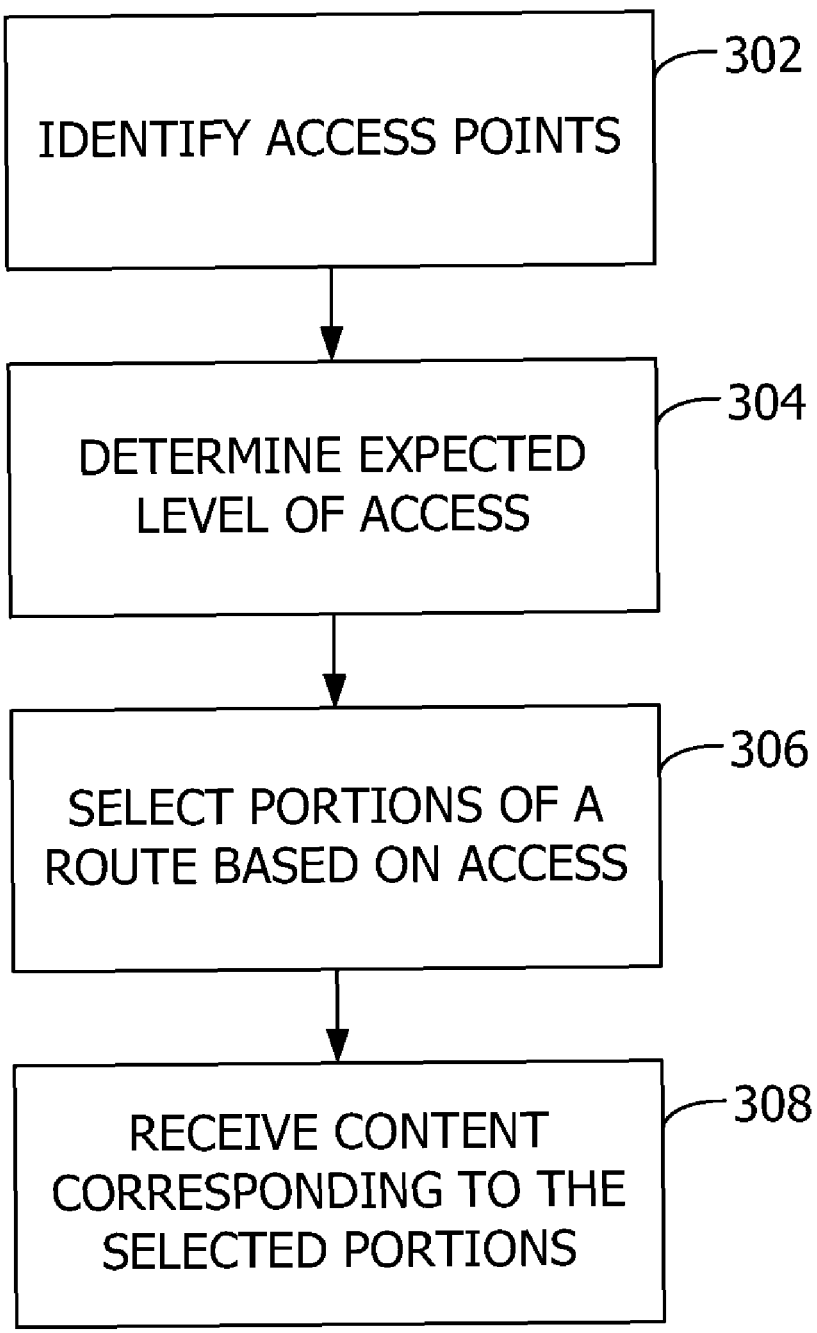
FIG. 3 is an exemplary flow chart illustrating the identification and caching of map tiles in areas of poor network connectivity.
Figure 4:
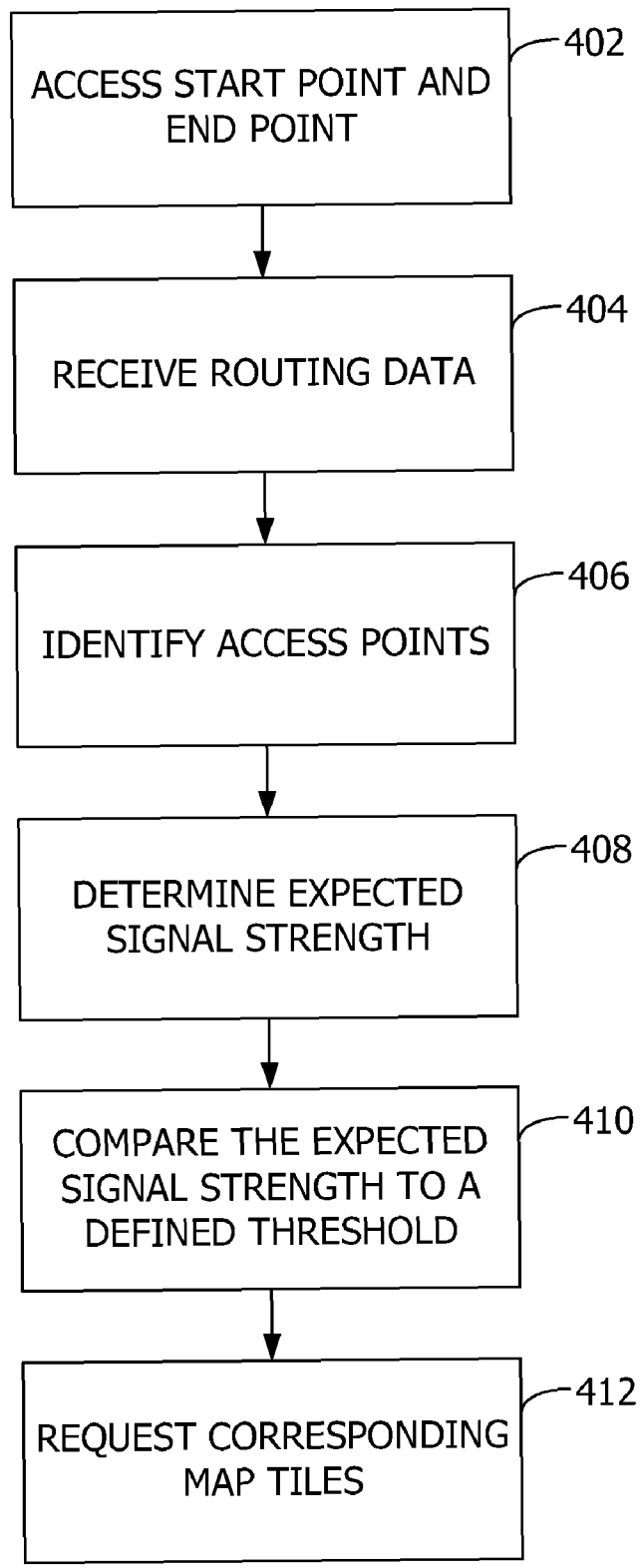
FIG. 4 is an exemplary flow chart illustrating the dynamic pre-fetching of map tiles when encountering areas of poor network connectivity.

With reference now to FIG. 3, one or more access points to the network 120 along a route for traversal by the first computing device 110 are identified at 302. In embodiments, the route includes a plurality of waypoints. At 304, an expected level of access to the network 120 along the route is determined based at least on the waypoints and the access points. For example, an expected bandwidth for a connection to the network 120 along the route is determined. In embodiments in which the network 120 includes a wireless network, determining the expected level of access includes determining an expected signal strength for a connection to the wireless network along the route.

At 306, one or more portions of the route are selected based on one or more criteria including the determined, expected level of access. The criteria may be received from a user of the first computing device 110 or may be set by an original equipment manufacturer of the first computing device 110, or by a developer of the navigation software executing on the first computing device 110. In embodiments, the criteria identify a threshold level of access (e.g., a minimum signal strength). In further embodiments, selecting the one or more portions of the route includes comparing the expected level of access with the identified threshold level of access to select the one or more portions of the route. In still further embodiments, the criteria include a storage capacity of the memory area 212. For example, the criteria may specify that only a particular amount of memory is available for storing the routing data 218. The first computing device 110 selects a quantity of portions of the route based on the available memory on the first computing device 110.

At 308, content corresponding to at least one of the selected portions of the route is received. For example, the content corresponds to the portions of the route having poor connectivity to the network 120. The receipt of content occurs prior to the first computing device 110 entering the at least one of the selected portions of the route (e.g., prior to entering the area with poor network connectivity). In embodiments, receiving the content includes receiving one or more of the following: map images, POI information, location information, a latitude of the waypoints associated with the selected portions of the route, a longitude of the waypoints associated with the selected portions of the route, and an altitude of the waypoints associated with the selected portions of the route. In further embodiments, receiving the content includes receiving one or more map images at a plurality of zoom levels. In still further embodiments, receiving the content includes one or more map images associated with areas near the route but not including the route (e.g., areas just outside the route).

Referring next to FIG. 4, an exemplary flow chart illustrates the actions performed before traversal of a route. The start point and the end point of the route stored in the memory area 212 (e.g., as routing data 218) are accessed at 402. At 404, the routing data 218 based on the accessed start point and end point is received from a wireless network. In embodiments, the wireless network includes one or more networks or network types. At 406, one or more access points to the wireless network along the route based on the received routing data 218 are identified. At 408, a determination is made regarding expected signal strength for accessing the wireless network along the route based at least on the identified access points. At 410, the determined expected signal strength is compared to a defined threshold to identify one or more portions of the route having the expected signal strength less than the defined threshold. At 412, the map tiles corresponding to at least one of the identified portions of the route are requested, received and stored in the memory area 212 prior to the first computing device 110 entering the at least one of the identified portions of the route. In embodiments, during traversal of the route, the received map tiles are accessed from the memory area 212 to provide images associated with the received map tiles for display. For example, the provided images may not have otherwise been available when the first computing device 110 was physically located in the portions of the route identified as having poor signal strength.

Figure 5:
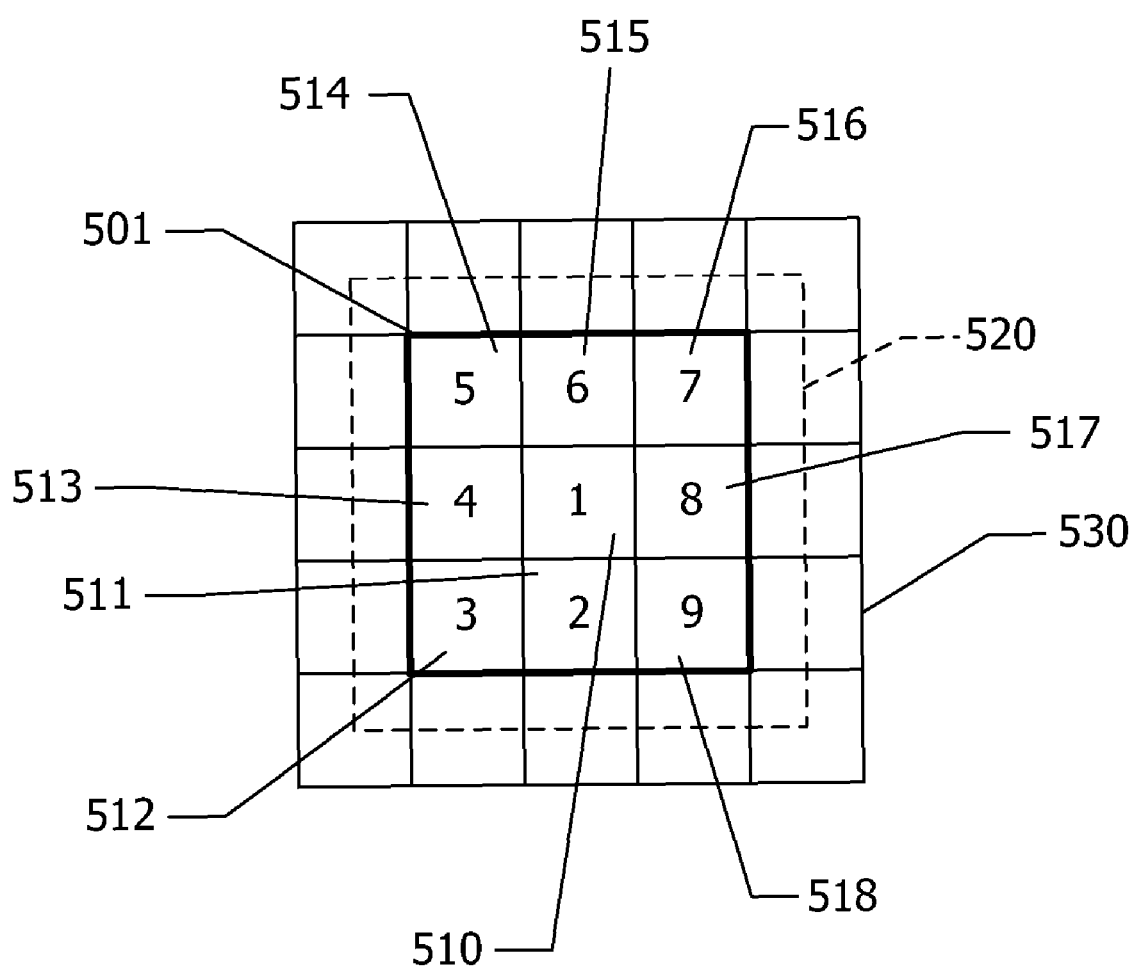
FIG. 5 is an exemplary map tile view displayed by an application program in a view port.
Figure 6:
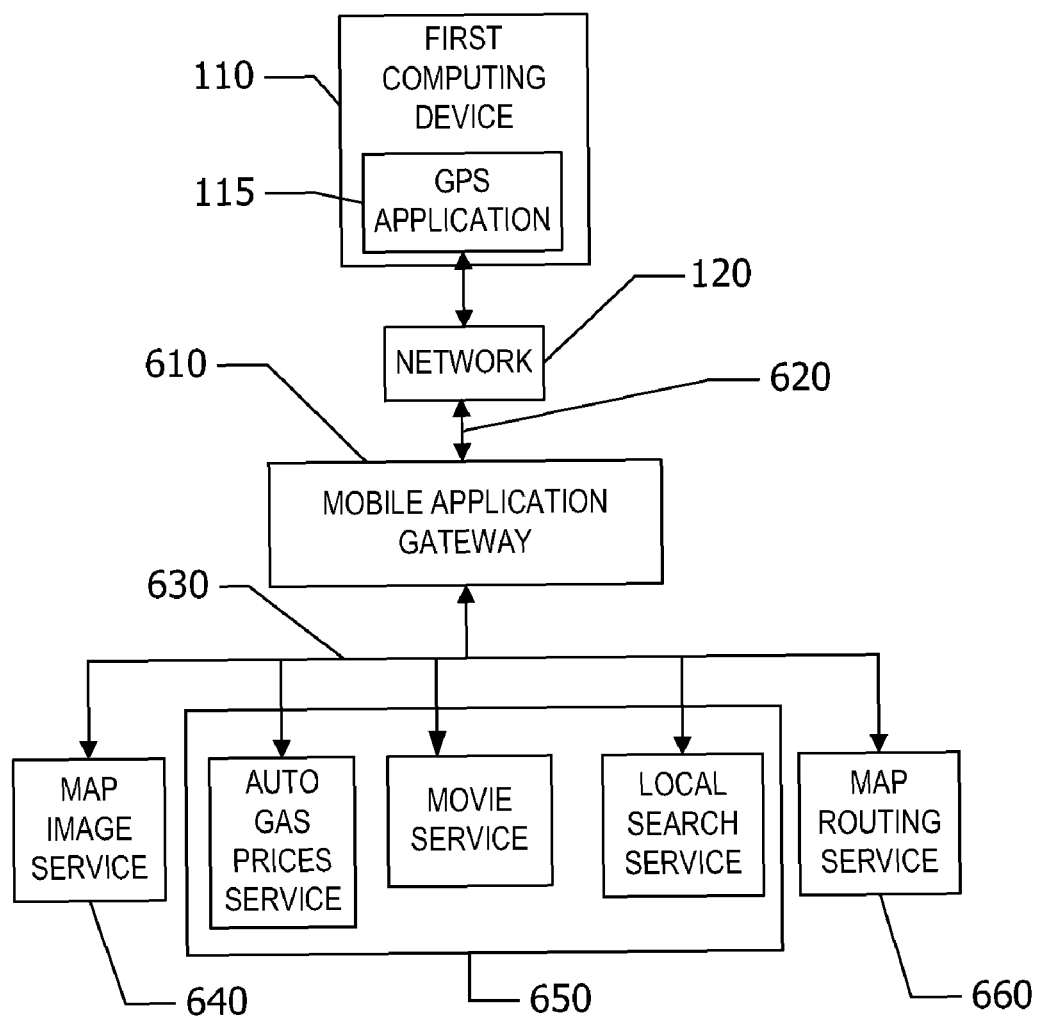
FIG. 6 is an exemplary block diagram illustrating a computing device receiving navigation data via a network.

Referring next to FIG. 5 and FIG. 6, an exemplary map view is displayed by a GPS application 115 in a view port by a mobile device such as the first computing device 110. The GPS application 115 displays (e.g., on display 216) or provides for display a map view as shown by visible view port 501. The view port includes several individual map tiles 510-518. The GPS application 115 requests enough map tiles to construct a complete display image to fill the view port 501. In addition to the visible area, the GPS application 115 downloads and retains half tiles, in some embodiments, to fill a perimeter of the visible display as shown by view port buffer 520 and partial tile(s) 530. The partial tile(s) 530 enable a smooth scrolling in any direction before another fetch of map tiles from a server (e.g., second computing device 130) or local cache is performed. In embodiments, the map tiles 510-518 are requested from the second computing device 130 in a spiral pattern starting with map tile 510 (the center tile) and proceeding to map tile 511, map tile 512, map tile 513, etc. in a clockwise fashion until all visible map tiles are requested before extending to cover the partial tile(s) 530 (e.g., half tiles) in the off screen view port buffer 520.

Referring again to FIG. 6, an exemplary block diagram illustrates the first computing device 110 receiving navigation data. The first computing device 110 executes the GPS application 115 to communicate with a mobile application gateway 610 using a protocol 620. The mobile application gateway 610 accesses web services via a protocol 630. Utilizing the first computing device 110, the user initially enters a start and end location into the GPS application 115. In embodiments, these locations may be in the format of a street address, city, state or POI such as "Eiffel Tower", or airport codes such as "SEA" for Seattle-Tacoma International Airport. In embodiments, the mobile application gateway 610 accesses map image service 640, and one or more of services 650 including an auto gas prices service, a movie service and a local search service. In further embodiments, the mobile application gateway 610 accesses a map routing service 660 that converts address values into geocoding values. The map routing service 660 assigns appropriate latitude and longitude values to an entity or address to enable display on a map and presentation to the user. The GPS application 115 retrieves from, for example, the map image service 640, associated map tiles to populate the view port 501 as shown in FIG. 5. The map tiles provide a detailed rendering of a local vicinity including local roads and POIs through a mosaic composition of one or more map tiles (e.g., map tiles 510-518). The rendering includes a complete representation of the current location at a selected zoom level. In embodiments, the GPS application 115 queries a POI database (not shown) using the map image service 640 as well as obtains latitude and longitude elevation map coordinates for the POI. Further, the map routing service 660 may be used to receive finely tuned driving-direction information including routing information, for example, to provide directions to the user from the start point to the end point.

In embodiments, a query of the map image service 640 and the map routing service 660 returns waypoints in the form of a series of shape points or line segments as well as native language localized turn-by-turn directions. The GPS application 115 requests appropriate map tiles based upon a current location of the first computing device 110 from, for example, the map image service 640. In embodiments, the map image service 640 returns user preferences for a zoom level in a range of 1-19, with level 1 showing the least amount of detail while level 19 is the most detailed rendering of an area of interest. For example, in a 250 by 250 pixel square, level 19 may show 0.002747 degrees of longitude per map tile (e.g., approximately one meter per pixel). In contrast, level 1 may show the entire earth, which is 1.44 degrees of longitude per pixel. Typically, a useful street level navigation is performed on level 15. Interpolation may also be performed by the GPS application 115 when an ability to retrieve map tiles is not available by bit stretching or image reduction using known techniques.

The map image service 640 may also provide rich texture and detail information that is superimposed over basic waypoint or shape points associated with route information retrieved from the map routing service 660 as determined by the latitude and longitude of the start point and end point of the requested route. In embodiments, the GPS application 115 may also invoke other services 650 such as the auto gas prices service, the movie service, and the local search service. Content from services 650 is obtained and populated on a visual rendering of a map as the user filters or select different topics of information.

Figure 7:
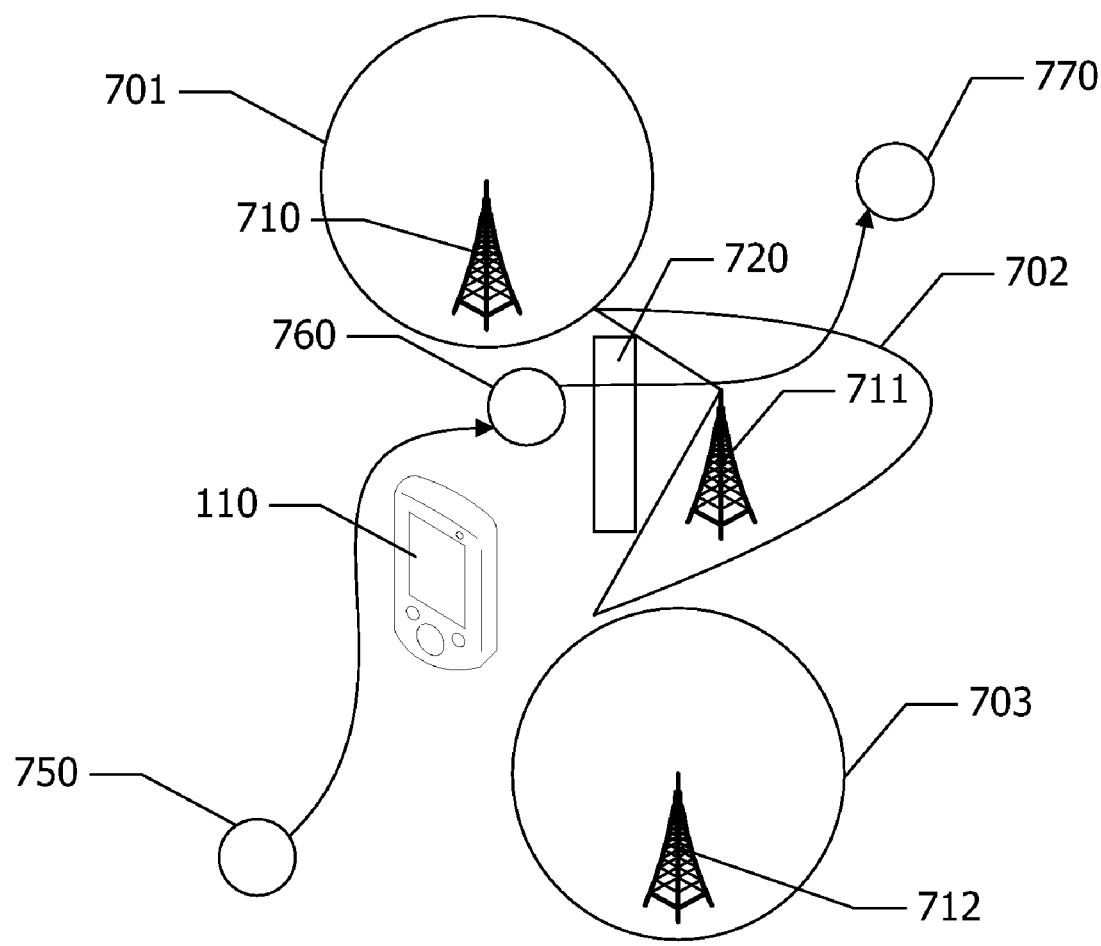
FIG. 7 is an exemplary diagram illustrating a computing device encountering areas of poor network coverage along a route.

FIG. 7 is an exemplary diagram illustrating traversal of a route by the first computing device 110. In embodiments, the map tile agent executing on the first computing device 110 examines a start point and an end point for a route shown as waypoints 750, 760, and 770. The map tile agent determines if any section of the route is anticipated to have insufficient network access. The signal coverage areas 701, 702, and 703 of cellular towers 710, 711, and 712, respectively, are illustrated in FIG. 7. The actual shape of each of the signal coverage areas 701, 702, and 703 differs based at least on topography. Object 720 is illustrated to be obstructing a signal coverage area of tower 711, preventing the first computing device 110 from accessing the network 120 when the first computing device 110 arrives at the waypoint 760. In embodiments, the first computing device 110 prepares for an anticipated loss of network connectivity by performing calculations such as a look ahead line of sight calculation between a location of the applicable towers (e.g., towers 710, 711, and 712) along the route and any potential geographic obstructions (e.g., object 720). Exemplary line of sight calculations include examining waypoint altitudes. The location of each of the towers 710, 711, and 712 may be stored, for example, in a database or other memory area accessible by the second computing device 130.

When the first computing device 110 is expected to experience low signal quality in some regions of the route, the corresponding map regions of the route are requested and cached at several default levels as a precaution against losing the signal and therefore losing the on demand data access to the network 120. The map tile agent preloads the map tile cache with the map tiles and selected zoom levels for those regions where content (e.g., map image data) is available but insufficient network connectivity exists. Alternatively or in addition, insufficient network connectivity may also include connectivity that incurs roaming data charges. In embodiments, alternative data access such as local wireless network access points are used in addition to the network 120 to retrieve map tiles when available.

In embodiments, the map tile agent monitors the status of the network 120 connection strength for comparison against a threshold. When the network 120 connection strength is low or when a signal strength is lower than a set threshold, the map tile agent aggregates additional map tiles (e.g., several miles of map tiles) until another tower (e.g., one of towers 710, 711, and 712) is expected to be encountered. This situation is often experienced during a boundary between the areas of coverage between towers 710 and 712 as shown in FIG. 7 at the waypoint 760. This prevents the user from briefly going out of coverage of useful data along the route and allows the real time position tracking feature to continue to function properly.

Exemplary Operating Environment

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the invention constitute exemplary means for determining portions of a route during which the first computing device 110 is expected to have limited access to a wireless network, and exemplary means for obtaining and caching content associated with portions of a route during which the first computing device 110 is expected to have limited access to the wireless network.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for a portable computing device providing navigation functionality, said system comprising:
    a memory area for storing routing data including a start point and an end point for a route, said routing data further including the route, said memory area further storing one or more map tiles associated with the route, each of said map tiles providing an image of at least a portion of the route; and
    a processor programmed to:
        access the start point and the end point stored in the memory area;
        receive, from a wireless network, the routing data based on the accessed start point and end point;
        identify one or more access points to the wireless network along the route based on the received routing data;
        determine expected signal strength for accessing the wireless network along the route based at least on the identified access points;

compare the determined expected signal strength to a defined threshold to identify one or more portions of the route having the expected signal strength less than the defined threshold; and request the map tiles corresponding to at least one of the identified portions of the route prior to the portable computing device entering said at least one of the identified portions of the route.

2. The system of claim 1, wherein the processor is further programmed to:

receive the requested map tiles from the wireless network;

store the received map tiles in the memory area prior to entering said at least one of the identified portions of the route; and access, during traversal of the route, the received map tiles from the memory area to provide the images associated with the received map tiles for display.

3. The system of claim 1, wherein the wireless network comprises one or more networks.

4. The system of claim 1, further comprising means for obtaining and caching content associated with portions of the route during which the portable computing device is expected to have limited access to the wireless network.

5. The system of claim 1, further comprising means for determining portions of the route during which the portable computing device is expected to have limited access to the wireless network.

6. A method comprising:

identifying one or more access points to a network along a route for traversal by a computing device, said route comprising a plurality of waypoints;

determining an expected level of access to the network along the route based at least on the waypoints;

selecting one or more portions of the route based on one or more criteria including the determined, expected level of access;

receiving content corresponding to at least one of the selected portions of the route, said receiving occurring prior to the computing device entering said at least one of the selected portions of the route; and storing the received content in a memory area for access during traversal of the route.

7. The method of claim 6, wherein determining the expected level of access comprises determining an expected bandwidth for a connection to the network along the route.

8. The method of claim 6, wherein the network comprises a wireless network, and wherein determining the expected level of access comprises determining an expected signal strength for a connection to the wireless network along the route.

9. The method of claim 6, wherein the criteria identify a threshold level of access, and wherein selecting the one or more portions of the route comprises comparing the expected level of access with the identified threshold level of access to select the one or more portions of the route.

10. The method of claim 6, further comprising receiving the criteria from a user of the computing device.

11. The method of claim 6, wherein receiving the content comprises receiving one or more of the following: map images, points of interest, location information, a latitude of the waypoints associated with the selected portions of the route, a longitude of the waypoints associated with the selected portions of the route, and an altitude of the waypoints associated with the selected portions of the route.

12. The method of claim 6, wherein receiving the content comprises receiving one or more map images at a plurality of zoom levels.

13. The method of claim 6, wherein receiving the content comprises receiving one or more map images associated with areas near the route but not including the route.

14. The method of claim 6, wherein the criteria comprises a storage capacity of the memory area.

15. One or more computer storage media having computer-executable components, said components comprising:

an interface component for receiving, by a first computing device from a second computing device via a connection, content corresponding to one or more waypoints in a sequential series of waypoints, said receiving occurring during traversal of a portion of a route by the first computing device;

an adapter component for determining a characteristic of the connection based on receipt of the content by the interface component;

a selection component for comparing the characteristic determined by the adapter component to one or more criteria; and a cache component for obtaining, by the first computing device from the second computing device based on the comparison by the selection component, content corresponding to at least one waypoint subsequent to the one or more waypoints in the sequential series of waypoints, wherein the cache component obtains the content during traversal of the portion of the route.

16. The computer storage media of claim 15, wherein the adapter component determines a signal strength for the connection during the receipt by the interface component of the content corresponding to the one or more waypoints, wherein the selection component compares the signal strength determined by the adapter component to a threshold value, and wherein the cache component obtains the content corresponding to the at least one waypoint if the signal strength is less than the threshold value.

17. The computer storage media of claim 16, wherein the cache component stores the content corresponding to the at least one waypoint for a time period exceeding a duration of traversal of the route.

18. The computer storage media of claim 15, wherein the cache component stores the content corresponding to the at least one waypoint for use during a reverse traversal of the route.

19. The computer storage media of claim 15, wherein the cache component obtains map images for the at least one waypoint.

20. The computer storage media of claim 15, wherein the interface component comprises a transceiver for a global positioning system.

* * * * *